United States Patent [19]

Fougere

[11] E Re. 29,090

[45] Reissued Dec. 28, 1976

[54] COIN SELECTOR UTILIZING A COIN IMPELLER

[75] Inventor: Guy L. Fougere, Lincoln, Mass.

[73] Assignee: Mars, Inc., McLean, Va.

[22] Filed: June 2, 1975

[21] Appl. No.: 583,192

Related U.S. Patent Documents

Reissue of:

[64] Patent No.: 3,701,405
Issued: Oct. 31, 1972
Appl. No.: 120,652
Filed: Mar. 3, 1971

U.S. Applications:

[63] Continuation of Ser. No. 423,220, Dec. 10, 1973, abandoned, and a continuation-in-part of Ser. No. 858,351, Sept. 16, 1969, abandoned.

[52] U.S. Cl. ..... 194/99; 194/101; 133/1 R

[51] Int. Cl.[2] ..... G07F 3/02

[58] Field of Search ..... 194/1 E, 1 K, 99, 100 R, 194/100 A, 101, 41; 133/1; 209/111.8; 294/65.5

[56] References Cited

UNITED STATES PATENTS

| | | | |
|---|---|---|---|
| 695,080 | 3/1902 | Ramspeck | 194/101 |
| 2,860,778 | 11/1958 | Becker | 209/111.8 |
| 3,575,273 | 4/1971 | La Jeunesse et al. | 194/101 |
| 3,599,771 | 8/1971 | Hinterstocker | 194/100 A |

FOREIGN PATENTS OR APPLICATIONS

| | | | |
|---|---|---|---|
| 139,554 | 6/1934 | Germany | 194/101 |
| 22,891 | 12/1967 | Japan | 194/100 |
| 151,897 | 2/1961 | U.S.S.R. | 73/163 |

*Primary Examiner*—Robert B. Reeves
*Assistant Examiner*—Joseph J. Rolla
*Attorney, Agent, or Firm*—Davis, Hoxie, Faithfull & Hapgood

[57] ABSTRACT

A coin selector which utilizes a coin impeller is disclosed, the impeller comprising [magnetic field means] *a magnetic field generator* for accelerating the coin. Coin velocity sensing [means] *photodetectors* located downstream from the coin impeller and associated circuitry serve to compare the coin's acceptance ratio with predetermined values for acceptable coins.

40 Claims, 13 Drawing Figures

INVENTOR.
GUY L. FOUGERE

BY

Davis, Hoxie, Faithfull & Hapgood
ATTORNEYS

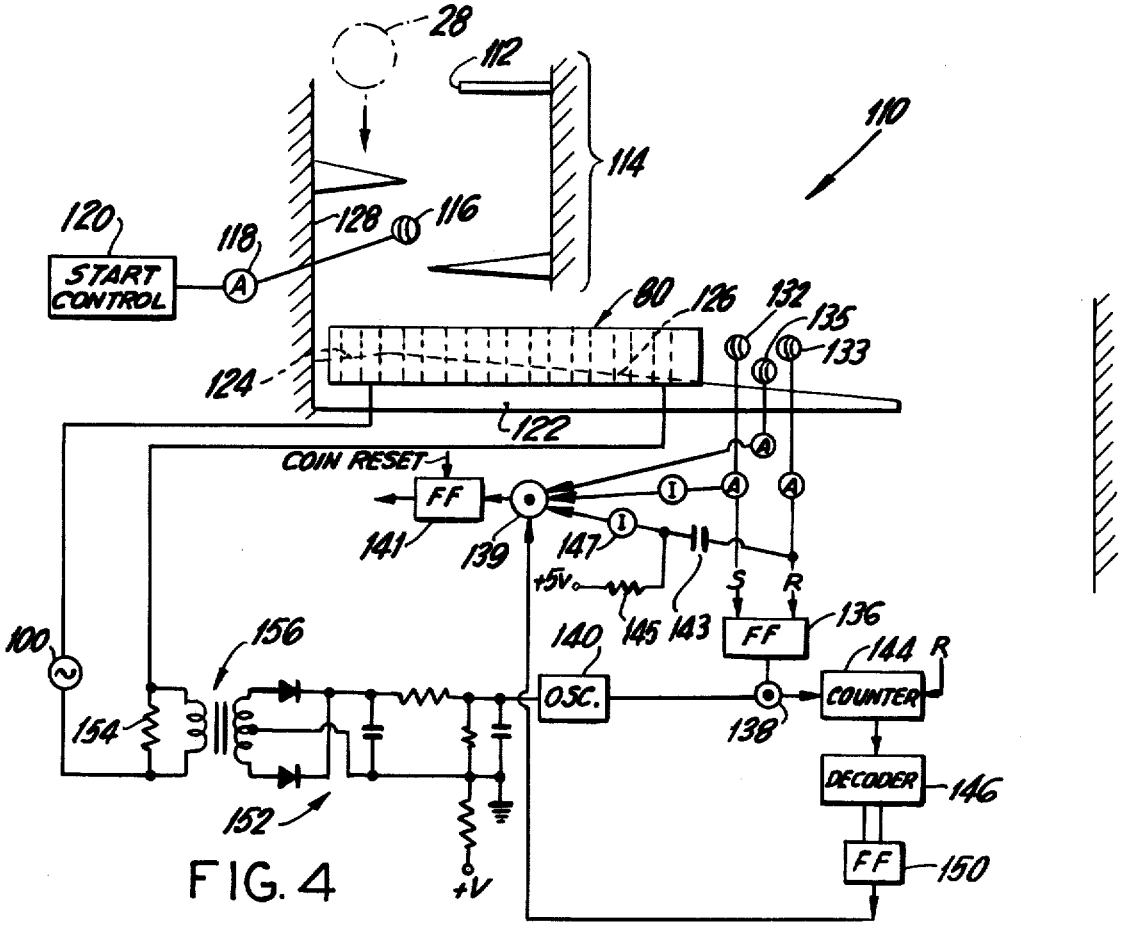
FIG. 4
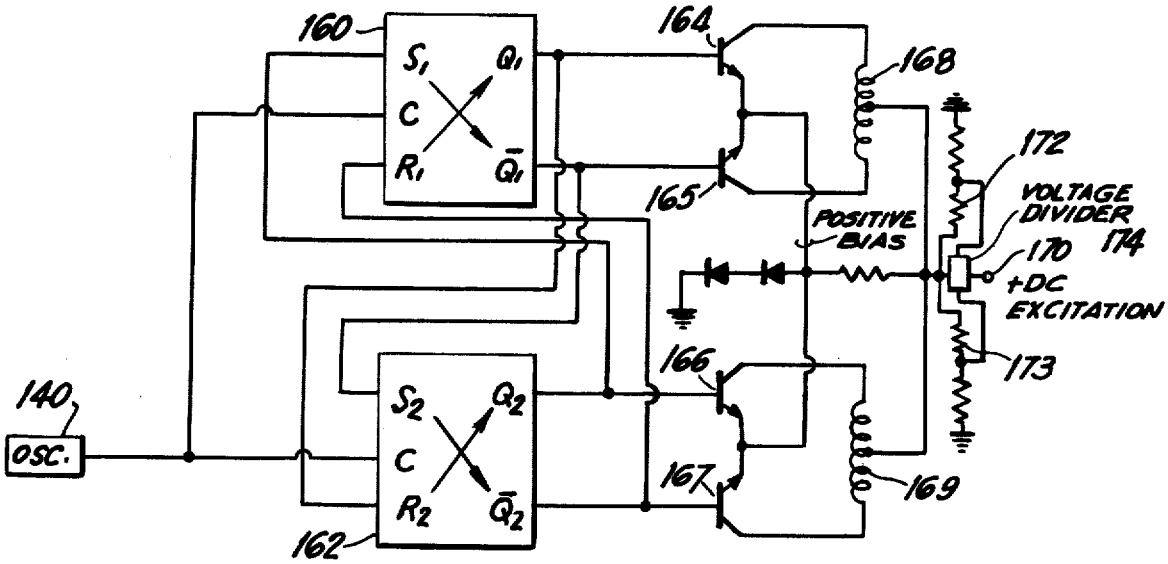
FIG. 5
| R | S | Q | Q̄ |
|---|---|---|---|
| 0 | 1 | 0 | 1 |
| 1 | 0 | 1 | 0 |
FIG. 5A
INVENTOR.
GUY L. FOUGERE
BY
Davis, Hoxie, Faithfull & Hapgood
ATTORNEYS

INVENTOR.
GUY L. FOUGERE

BY

Davis, Hoxie, Faithfull & Hapgood
ATTORNEYS

INVENTOR.
GUY L. FOUGERE

BY

Davis, Hoxie, Faithfull & Hapgood
ATTORNEYS

COIN SELECTOR UTILIZING A COIN IMPELLER

Matter enclosed in heavy brackets [ ] appears in the original patent but forms no part of this reissue specification; matter printed in italics indicates the additions made by reissue.

*This application is a continuation of reissue application Ser. No. 423,220, filed Dec. 10, 1973, now abandoned,* a continuation-in-part of Patent Application Ser. No. 858,351 filed Sept. 16, 1969, now abandoned.

This invention relates to coin selectors which determine the authenticity and denomination of coins and, more particularly, to magnetically impelling coins in a coin selector.

Coin operated devices, such as vending machines, coin changers and toll booths have universal acceptance and are widely used. These coin operated devices must have the capability of accurately and rapidly determining the authenticity and denomination of coins entering the device.

The coin impellers of this invention induce a wide velocity range between coins of different denominations making it easier to test and sort coins accurately. By virtue of the fact that the motion given to the coin through the coin selector system is effected primarily by the coin impeller rather than by gravity, the velocity variance for any given coin is extremely small, in the order of ±2 percent. Reliability and effectiveness of the coin selector of this invention is high because of the minimal variation in coin velocity.

Accordingly, it is one objective of this invention to provide a coin selector and method of coin selection utilizing a magnetic impeller of coins in order to substantially improve the reliability and effectiveness of a coin selector in sensing the authenticity and denomination of coins.

Another objective of this invention is to provide a coin selector which is both unaffected by the velocity imparted to a coin as it is inserted into the coin selector relatively independent of coin wear.

In the drawings:

FIG. 4 is a schematic elevational diagram of a coin selector utilizing the linear motor impeller of FIG. 3.

FIG. 5 is a diagram of a circuit enabling the use of D.C. to energize a linear motor impeller while FIG. 5A is a table and FIG. 5B is a logic voltage time plot showing the operation of the circuit of FIG. 5.

DETAILED DESCRIPTION

Coin Selector

Throughout this specification and in the appended claims, the term "coin" is intended to mean genuine coins, tokens, counterfeit coins, slugs, washers, and any other item which may be used by persons in an attempt to use coin-operated devices. Furthermore, throughout this specification, for simplicity, coin movement is described as rotational motion; however, translational motion also is contemplated.

Figure 1:
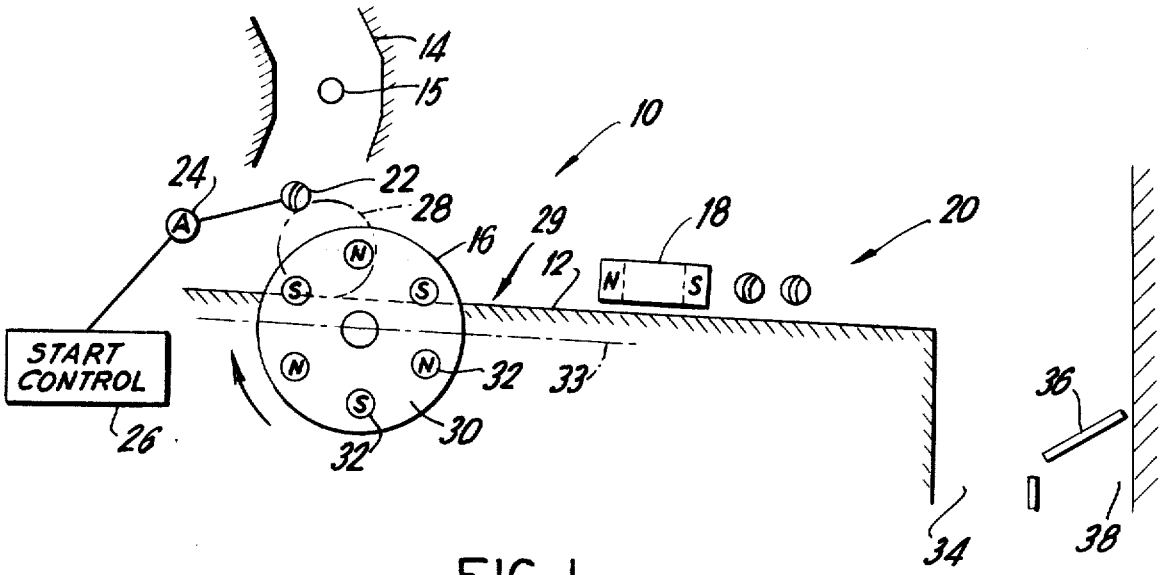
FIG. 1 is a schematic, elevational diagram of a device for determining the authenticity and denomination of a coin, the device including a rotary coin impeller formed in accordance with a first embodiment of this invention which utilizes permanent magnets.

With reference to FIG. 1, there is illustrated, in schematic form, a coin selector 10 for electrically conductive coins comprising, in part, a coin support track 12, coin arrestor means 14, a magnetic coin scavenger 15, a coin impeller 16, a brake magnet 18 and means 20 for sensing functions dependent upon properties of a coin to determine the coin's authenticity and denomination.

A coin, after entering the coin selector device 10, passes through a coin arrestor means 14. In FIG. 1, the arrestor means comprises a meander path which absorbs most of the coin's kinetic energy and reduces the coin's velocity in the horizontal direction to an insignificant value. Any magnetic coin scavenger 15, such as one of the types illustrated in U.S. Pat. Nos. 1,956,066 and 3,168,180 is located in the path of coin travel to extract coins made of ferromagnetic material from the coin selector 10. It is desirable to remove such coins when permanent magnets are located elsewhere in the system to avoid having ferromagnetic coins trapped by those magnets. Alternatively, one or more of the other magnets could serve as a magnetic coin scavenger if additional means are provided to clear the magnets of a magnetic coin which is adhered thereto. As the coin approaches the coin impeller 16, it passes an arrival sensing device 22 which senses the presence of a coin in the system. While many sensing devices are suitable, such as microswitches or inductive switches, a preferred sensor is a photoelectric device such as a photocell operating in combination with a light source, and the coin being directed between the light source and photocell. The signal from the photocell indicating coin presence, through an amplifier 24, energizes a start control system 26 for purposes to be described below.

The coin, illustrated by the phantom lines 28, reaches the coin support track 12 where it is brought into proximity with the coin impeller 16. The track 12 forms the bottom of coin passageway 29 and primarily serves as a support for the coin 28. The track 12 is not provided with a sufficient slope to cause the coin to roll with significant velocity. While the track can be horizontal, it is preferred that the track have a slight slope, in the order of 2° and not greater than 5°. A slight downward slope toward the property sensing means 20 is preferred; so that in the event that an electrically non-conductive coin, such as a plastic disc, is inserted into the coin selector 10 and is unable to be propelled by the coin impeller 16 the slignt slope of the track 12 will cause the coin to roll through the system at a slow speed. This will prevent the coin from remaining near the impeller 16 and eliminate the chance that the coin will accelerate to a velocity equal to the velocity of an acceptable coin. Alternatively, the track 12 can be oriented downwardly away from the property sensing means 20 toward a coin rejection chute (not shown).

Rotary Coin Impeller - (FIG. 1)

The coin impeller 16 is formed in accordance with the first embodiment of this invention includes a rotor 30 formed of a non-magnetic material such as plastic which has a plurality of permanent magnets 32 mounted around the periphery thereof, three such magnets (six pole faces) being illustrated in FIG. 1. The magnets are mounted so that the polarity of adjacent magnets alternate between north and south. The rotor 30 is mounted so that the coin 28 is located on one side of a diametrical line 33 parallel to the coin support track 12. This is accomplished by keeping the center of rotation of the rotor 30 below the plane of the support track 12. The purpose for this is to ensure that the coin is subjected to a magnetic flux having a horizontal component only in the direction in which it is desired that the coin travel, namely, from left to right in FIG. 1 when the rotor rotates clockwise.

An arriving coin passes through the meander path 14 and occludes the photocell 22 which, through the signal generated by the occlusion of the sensor, signals the start control 26. The start control 26 includes, among other things to be discussed below, switch control means for energizing the motor to rotate the rotor 30. When the coin arrives at the impeller 16 the rotating magnets (rotating in the clockwise direction as illustrated in FIG. 1) produce a rotating magnetic field having a horizontal component above the coin support track 12 in the direction toward the property sensing means 20. The rotating magnetic field induces eddy currents in the coin 28 producing an associated magnetic field which interacts with the rotating magnetic field to produce a force on the coin in the direction of movement of the traveling magnetic field, namely from left to right in FIG. 1. The coin's acceleration and ultimate velocity are dependent upon the coin's acceptance ratio, which is its electrical conductivity divided by its density.

The impeller 16 normally is sufficient to provide enough of a velocity differential between coins having different coin acceptance ratios to permit coin discrimination. However, with some coin sets it may be desirable to supplement the impelled velocity differential by utilizing an eddy magnetic current brake. A stationary permanent magnet 18 is located on one side of the coin support track 12 and a second magnet or plate (not shown) of ferromagnetic material such as mild steel, is located directly opposite the magnet 18 in order to provide a constant field across the coin passageway. As the coin passes through the region of the stationary magnetic field eddy currents are induced in the coin and the associated magnetic fields, which oppose the field inducing the eddy currents, interact with the stationary magnetic field to create a retarding force. In other words, the resultant force on the coin is in the direction from right to left in FIG. 1. The magnitude of the coin's deceleration is dependent upon the coin's acceptance ratio, as well as the velocity of entry of the coin into the stationary magnetic field and the area of the coin and the magnetic field region.

Coin Acceptance Ratio Sensor

The coin leaving the stationary magnetic field supplied by the permanent magnet 18 enters the region of sensing means 20 which together with a combinational circuit are provided to examine the property of the coin related to velocity. A particular apparatus used is described in detail below with reference to FIG. 4. The sensing means together with the combinational circuit provide a signal to a solenoid controlled inclined platform 36 indicative of the acceptability of the coin. If, the coin is unacceptable it rolls off the track 12 and is directed into a rejection chute 34 by the platform 36. If the coin is determined to be acceptable a solenoid (not shown) is actuated and retracts the platform 36 from the path of the coin allowing the coin to fall into an acceptance chute 38.

Figure 2:
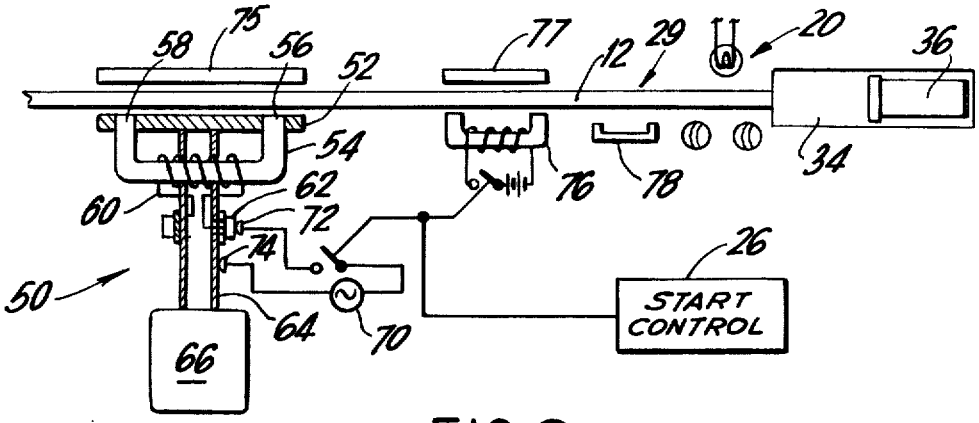
FIG. 2 is a schematic plan view of a coin selector including a rotary coin impeller formed in accordance with a second embodiment of this invention which utilizes electromagnets.

Electromagnetic System (FIG. 2)

The first embodiment described above employs permanent magnets 32 as part of the impeller 16 and a permanent magnet 18 as the magnetic brake. Alternatively, electromagnets can be used either for the impeller or for the magnetic brake or for both.

An electromagnetic coin impeller 50 is illustrated in FIG. 2 and includes a non-magnetic rotor 52 on which are mounted a plurality of C-shaped iron cores 54 (only one of which is illustrated). The cores are mounted on the rotor 52 so that only the pole faces 56, 58 extend through and face the coin support track 12. A wire coil 60 is wound about the central portion of the iron core 54, one end of the coin being connected to a slip ring 62 mounted on a shaft 64 leading from the rotor 52 to a driving motor 66. The other end of the coil 60 is electrically connected to a second slip ring. Electricity from a source 70, shown as alternating current (A.C.) but which could be direct current (D.C.), is conveyed to the coil 60 through the slip ring 62 and shaft 64 in any conventional manner, such as by shoes 72, 74. If A.C. is used, the rate of rotation of the rotor 52 and the frequency of the current should be chosen to avoid minimum magnetic field strength when the magnet is above the track 12 such as might be caused if the relationship of frequency and rotation is such that one or more of the electromagnet poles is subject to an A.C. zero crossing while the pole is above the track 12. A low reluctance magnetic shunt such as a plate 75 of a ferromagnetic material is mounted opposite the upper half of the rotor 52 to affect a constant field across the coin passageway so that a coin's movement is influenced relatively uniformly regardless of which side of the track the coin is on.

If a magnetic brake is used, any conventional electromagnet can be utilized as the brake magnet 76. A D.C. electromagnet is preferred because the transit time of a coin through the field generated by the brake magnet 76 is comparable to or less than the frequency period of conventional current, namely 60 cycles. If A.C. current is used, the braking experienced by a coin is dependent upon the timing of its entry into the magnetic field relative to the phase of the current supply. To avoid this problem and to establish satisfactorily high levels of braking, a substantial current is passed through the electromagnet coil resulting in the generation of, and the need to dissipate a substantial amount of heat. Because of these problems, a D.C. electromagnet is preferred. A ferromagnetic plate 77 is mounted opposite to the brake magnet 76 to provide a constant magnetic braking field across the coin passageway.

It will be recalled that as the coin 28 enters the system and approaches the coin impeller, it passes an arrival sensor 22 which senses the presence of the coin and actuates a start control 26. The start control, through switch means, actuates the coin impeller 50 and the eddy current brake electromagnet 76 for a prescribed time interval which is long enough to permit the slowest acceptable coin to pass through the system, after which the switches are opened inactivating the coin impeller 50 and electromagnet 76.

Since this system utilizes electromagnets which can be rendered substantially neutral by cutting off the current supply, there is no need to use a ferromagnetic coin scavenger. If a coin of ferromagnetic material is inserted into the system, it will be trapped by one of the electromagnets, probably the impeller magnet. After the current through the magnets is terminated, the ferromagnetic coin will roll slowly down the coin support track 12 under the influence of gravity. The ultimate departure velocity of the ferromagnetic coin will be extremely low due to the slight slope of the track 12 and due to the residual magnetism of the electromagnets, thereby permitting distinction between ferromagnetic coins and other coins which have a low velocity. Instead of relying merely on the track slope and the residual magnetic field to ensure a very low velocity for ferromagnetic coins, a third magnet 78 having a very low flux density can be utilized downstream from the brake magnet 76.

It is also important, in order to produce consistent and reliable results, for the magnitude of the current switched into the electromagnets to be controlled within limits, preferably less than ±½ percent. This can be accomplished by conventional rectifying, filtering and regulating circuitry not illustrated or described herein but which is well known in the art.

Figure 3:
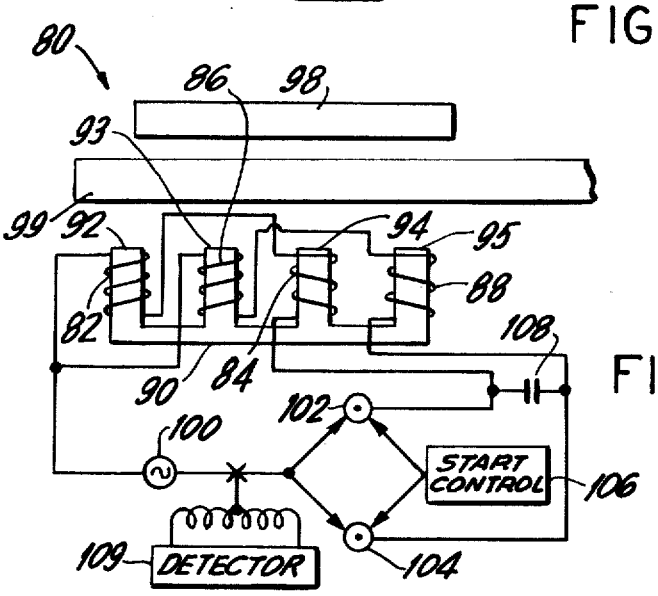
FIG. 3 is a schematic illustration of a linear motor coin impeller formed in accordance with a third embodiment of this invention.

Linear Motor Impeller (FIGS. 3 & 4)

In place of the rotary coin impeller described above in connection with the first and second embodiments, it is preferred to use stationary means for producing a traveling magnetic field. Such can be accomplished by using a linear motor which is similar to a stator of a conventional cylindrical electric motor which has been cut along a radial plane and unrolled out flat. As is illustrated in FIG. 3, such an impeller 80 comprises two series of coils, a first series including coils 82 and 84 and a second series including coils 86 and 88. While only two coils per series are illustrated, a greater number of coils is preferred, for example, about four per series. The coils are wound around a low carbon steel impeller core 90 having projecting pole pieces or core fingers 92–95 spaced longitudinally along the desired direction of coin travel. A low reluctance magnetic shunt or magnetic return path 98 is placed at the side of the coin track 99 opposite the impeller 80 to provide a uniform magnetic field across the coin passageway. The magnetic shunt may be made of a low carbon steel plate. It is desirable in the case of high flux densities that the core 90 be laminated steel.

In order to produce the effect of a traveling magnetic field, it is necessary for adjacent fields to have a phase shift relationship. FIG. 3 illustrates a circuit which is suitable for providing approximately a 90° phase shift between adjacent core fingers. It can be seen that the first series of coils 82, 84 is wound in alternating fashion, in other words, coil 82 is wound in a counterclockwise direction about core finger 92 while coil 84 is wound clockwise about core finger 94. The second series of coils 86, 88 similarly is wound in alternating fashion, namely coil 86 is wound counterclockwise about core finger 93 while coil 88 is wound clockwise about core finger 95.

Either the first series or the second series of coils can be individually selectively connected directly to a source of cyclically varying current, for example, chopped D.C. or single phase sinusoidal A.C. current source 100, such as by AND gate 102 and AND gate 104 respectively, which are controlled by signals from start control circuit 106. In the case where single phase sinusoidal AC current is used, the two series are connected in parallel through a capacitor 108 thus placing the capacitor in series with the coil series not directly gated on. The capacitor 108 provides a 90° phase shift between the two series of coils. Because of the reversed direction of windings of adjacent coils within a series and the phase shift between the coil series provided by the capacitor 108, the magnetic field is effectively traveling in one direction. For example, at one instant of time assuming the polarity of the first coil 82 is north, the polarity of coil 86 is north plus 90°, the polarity of coil 84 is south and the polarity of coil 88 is south plus 90°. The thrust direction of impeller 80 is reversed by merely enabling the presently disabled AND gate and vice versa. This permits selection of a desired thrust direction for purposes described below.

To provide consistent coin velocities, it is preferable to activate the impeller 80 each time at the same fixed point in the impeller current wave form. In this way the resultant coin velocity is not dependent upon the particular moment of time when the coin is first exposed to the magnetic field of the impeller. The zero crossing detector 109 is designed to detect the zero crossing of the impeller current in the direction providing desired initial polarity. The zero crossing detector 109 includes a saturation amplifier, a diode and differentiator to select the desired direction of transition and a latching relay operated by the output of the differentiator.

Coin Selector System

Turning now to FIG. 4, a coin selector system 110 for nonferromagnetic coins, utilizing a linear motor impeller 80, is schematically illustrated. A coin entering the system through an entrance slot 112 drops vertically downward through an entrance meander section 114 which slows the coin and removes most of its energy. The coin passes an arrival sensor 116 such as a photocell which senses the presence of the coin in the system and, through an amplifier 118, energizes a start control system 120 which in turn energizes the impeller 80 after a slight delay. After passing the arrival sensor 116 the coin drops onto a coin support track 122.

The support track is designated with an initial short section 124 having an inclined slope of between 0.5° – 5.0°, preferably approximately 1.5°, followed by a declining longer portion having a declination of approximately the same slope. The coin drops onto the initial portion 124 and, due to the inclination, rolls rearwardly (toward the left in FIG. 4) until it comes to rest against a wall 128. The system is designed with a delay in energizing the impeller such that the impeller is energized after sufficient time has elapsed for the coin to come to rest against the wall 128. The impeller is located with respect to the track 122 such that portions of at least two pole faces are adjacent the resting place of the smallest coin desired to be accepted by the coin selector. Once the impeller is energized, the coin, if electrically conductive and para or dia-magnetic, will be caused to move along the track 122 by rolling up the inclining portion 124 and then down the declining portion 126. The coin movement is produced by eddy currents induced in the coin which produces an associated magnetic field. The interaction between the induced magnetic field in the coin and the field of the forwardly adjacent coil of the impeller causes the coin to move toward that coil. The acceleration and velocity of the coin as it leaves the impeller 80 is determined by the coin's acceptance ratio for the reasons discussed above. The impeller is turned off by a signal from the sensors indicating that the coin has left the impeller.

If a ferromagnetic coin is inserted into this system, it will be attracted to the impeller and retained in place. After a predetermined period of time, which is based upon the longest period of time that would be required for an acceptable coin to traverse the support track 122, the impeller is turned off and the ferromagnetic coin remains at the initial section 124 of the track. By operation of any conventional coin rejection system the ferromagnetic coin is forced to drop off the track 122, into a coin rejection receptacle. Similarly, if an electrically nonconductive coin, such as a plastic slug, is inserted into the system, the coin will not be impelled by the impeller 80 and will be removed by the coin rejection system.

In order to insure proper impelling of nonferromagnetic electrically conductive coins, of the impeller poles are spaced so that any acceptable coin will be influenced by the fields of two poles simultaneously, so that the coin feels the effect of the traveling magnetic field. This may be accomplished by designing the impeller so that the dimension between corresponding points of adjacent pole pieces is no greater than the diameter of the smallest acceptable coin. To avoid a high loss factor and heating, the spacing between adjacent poles of the impeller should be more than the effective air gap between the impeller 80 and the magnetic shunt 98. The effective air gap between the impeller 80 and the magnetic shunt actually is twice the distance between the impeller and the shunt because the effective gap is based upon the entire magnetic path and, therefore, includes the gap twice, once at the north pole and once at the south pole. It can be seen that in constructing the impeller, the two design parameters just discussed define the lower and higher limits for the spacing between adjacent coils. If a compromise is needed in order to satisfy these design parameters, the loss factor and heating caused by distance between the poles being less than the air gap can be tolerated within limits.

As described above, the coin support track 122 is provided with an initial inclined portion 124 for the purpose of bringing the incoming coin to rest at a predetermined position. One alternative to this design is to utilize a track having a continuous surface declining from the wall 128 at an angle of approximately 1½°. When the coin enters the system and passes the arrival sensor 116, the impeller is initially energized to impel the coin in a rearward direction or, in other words, toward the wall 128. After a short period of time with the impelling force continually being exerted on the coin toward the wall 128 the coin will be brought to rest against the wall at which time the direction of the magnetic field is reversed and the coin is impelled forwardly away from the wall 128. This insures that all coins start from rest and from a fixed position and provides the desired consistency of performance.

Electronic Coin Acceptance Ratio Sensing System

The impeller 80 causes the coins to move along the track 122 with a velocity which is dependent upon the coin's acceptance ratio. It now is necessary to determine if the coin is acceptable. This is accomplished by coin presence sensors and associated combinatorial circuitry described hereinafter or, for example, by those devices disclosed in copending applications assigned to the assignee of this application: Ser. No. 91,871, filed Nov. 23, 1970, Ser. No. 172,922 filed Aug. 16, 1971, and Ser. No. 219,327, filed Jan. 20, 1972.

For purposes of the discussion below it is assumed that the coin selector 110 is designed to accept coins of only one denomination, although it is clear that the coin selector is capable of distinguishing several different coins by employing the disclosed techniques.

The coin, being impelled by the impeller 80 toward the right in FIG. 4 passes a pair of conventional sensors or detectors such as inductive switches, photoelectric devices, etc. In this discussion, photocells are used as sensors. Light sources (not shown) and photocells 132, 133 are mounted on opposite sides of the track 122, the photocells being located close together and in close proximity to the impeller 80. As the coin leaves the impeller 80 it occludes the first sensor 132 which sets a flip flop 136 enabling an AND gate 138. When the coin occludes sensor 133, the flip flop 136 is reset, disabling the AND gate 138. The interval during which the flip flop 136 is set is inversely proportional to the coin velocity and, therefore, is inversely related to the coin's acceptance ratio.

The output pulses of timing oscillator 140 are fed to the enabled AND gate 138 from which they are gated into a counter 144. The output of the counter, which is fed to a decoding matrix 146, is inversely proportional to the velocity of the coin. The output of the decoder 146 is fed to flip flop 150. A flip flop is set by the count representative of the lower limit of acceptable velocity for the particular coin denomination which the flip flop represents and is reset by the count representative of the upper limit of velocity of that particular coin. If a coin having a velocity within the range of an acceptable coin passes through the system, flip flop 150 will be set indicating that a coin which has passed through the system has a velocity within a range equal to the velocity range that an acceptable coin would have after acceleration by the impeller.

An accurate examination of a coin's velocity may not be sufficient to accurately determine the authenticity and denomination of a coin. It has been found that the information obtained from conducting both an examination of a chordal dimension of the coin and an examination of its velocity provides sufficient information to confidently determine the coin's authenticity and denomination.

One method of determining whether a coin's diameter or other chosen chordal dimension is within an acceptable range is illustrated in FIG. 4. A pair of sensors 132, 135 corresponding to each acceptable coin is employed in combination with a primary sensor 133, the sensor 135 closer to the primary sensor checking the minimum acceptable dimension and the sensor 132 further from the primary sensor checking the maximum acceptable dimension. The distance between the pair of sensors 132, 135 is equal to the acceptable dimensional variation of a particular coin and the distance between the sensor 135 and the primary sensor 133 is equal to the minimum acceptable dimension for that coin. The inverted output from the sensor 132 and the output from the sensor 135 are fed to separate inputs of an AND gate 139. The primary sensor 133 is connected through a capacitor 143 to the input of an inverting gate 147. A source of power sufficient to operate gate 147, in this case 5 volts, is also connected to the same input through a resistor 145. The output of gate 147 is connected to an input of AND gates 139. When the primary sensor 133 is first obscured, capacitor 143, resistor 145 and the voltage applied through resistor 145 produce a short pulse at the input of AND gate 139. If a coin passing through the coin selector 110 has a particular dimension larger than the distance between the primary sensor 133 and the nearest sensor 135 but smaller than the distance between the primary sensor 133 and the furthest sensor 132, and flip flop 150 is set when sensor 133 is first occluded, then AND gate 139 is enabled when the coin first occludes sensor 133 and a flip flop 141 is set indicating that a coin of acceptable dimension and velocity has passed through the selector.

Since each pair of sensors 132, 135, each AND gate 139 and each flip flop 141 represents one coin, the number of these elements used equals the number of denominations of coins the coin selector 110 is designed to accept. Also, each acceptable coin has a corresponding coin velocity flip flop (for example flip flop 150) and the output from this flip flop can be fed to the AND gate 139 for that coin so that when the flip flop 141 is set it indicates that both the chordal dimension and coin acceptance ratio dependent velocity of the coin passing through the coin selector 110 is the same as those properties of a particular acceptable coin.

Impeller Current Control of Clock Oscillator Frequency

The acceleration of the coin is proportional to the current through the impeller coils. The coil current is dependent on the magnitude of the exciting or source voltage and the impedance of the impeller windings. Conventional A.C. supply voltage varies by at least ±10 percent and the resistance of the winding changes by a similar amount due to temperature, manufacturing variances and minor variations in wire diameter. Because the coin velocity is dependent upon the strength of the impeller's magnetic field, and the magnetic field strength is dependent upon the voltage supply, supply voltage variations cause a resultant change in coin velocity and, therefore, a change in the elapsed time during which coins of the same denomination pass between the two sensors 132, 133. If the clock oscillator 140 which feeds pulses into the counter 144 has a constant frequency regardless of the impeller coil current, the number of clock pulses gated into the velocity counter 144 will vary with changes in impeller current for identical coins and could indicate unacceptability of a coin which actually is acceptable.

To overcome this problem a feedback signal derived from the impeller current source 100 is applied to the clock oscillator 140 by the circuit 152. The impeller 80, including the coils and phase shift capacitor, receives its current from the supply 100 and a current sampling resistor 154 is placed in series with the impeller 80. The clock oscillator 140 is a voltage controlled oscillator and the control voltage is supplied by means of a transformer coupling 156 the primary of which is across the current sampling resistor 154. The oscillator current is caused to be of the proper polarity by circuit 152 so that as the impeller current increases thus increasing the coin velocity and reducing the time interval during which the clock pulses are gated into the counter 144, the oscillator frequently is increased. The higher oscillator frequency provides a greater number of pulses to the counter 144 to compensate for the shorter gate time. Conversely, when the impeller current decreases and the coin velocity decreases, the oscillator frequency is decreased to gate fewer pulses into the counter during the longer gate time. Therefore, while the coin's actual velocity varies considerably because of supply voltage variations, the apparent velocity is normalized to within 1 percent or 2 percent by this system.

Figure 5B:
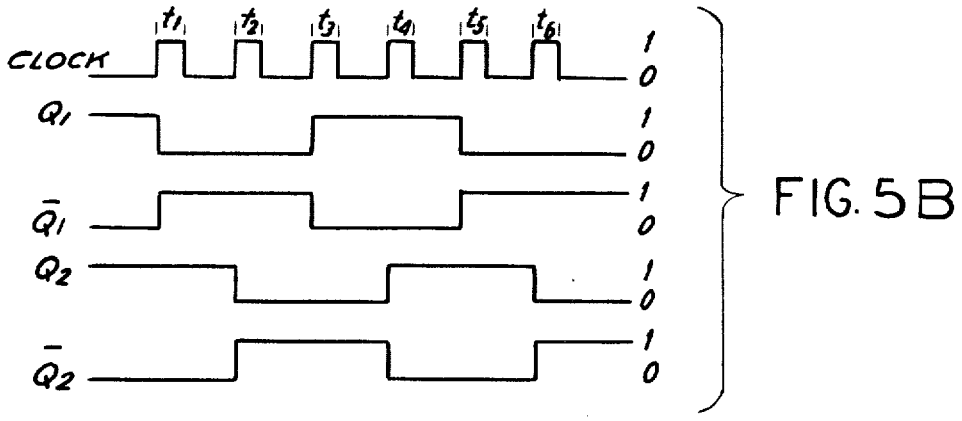

Switched Direct Current Energization of Impeller (FIG. 5)

Instead of using power line frequency A.C. to energize the impeller 80, in some instances, it is advantageous to use switched D.C. The circuit illustrated is FIG. 5 is one technique which can be utilized. There is illustrated two dual clocked R—S flip fops 160, 162 whose operation is described by means of the table shown in FIG. 5A and the logic voltage diagram 5B. The dual flip flops are interconnected in a manner which, at the frequencies involved (e.g. under 4,000 Hz) eliminates the possibility of ambiguity associated with simultaneous similar logic states at the "S" (set) and "R' (reset) inputs of each dual flip flop. The dual clocked R—S flip flops 160, 162 do not change state until a positive input pulse is received. Flip flop 160 is readied to change state by a coin entering the system such as by means of the start control system 120. When the first positive clock input pulse is received transition takes place ($t_1$) and the change of state of $Q_1$ and $\bar{Q}_1$ readies flip flop 162 for a change of state, which change occurs at the next positive clock pulse ($t_2$). When $Q_2$ and $\bar{Q}_2$ change state flip flop 161 is readied for a change of state which occurs at the next successive positive clock ($t_3$) and so on.

The outputs of the flip flops 160, 162, which have a quadrature phase shift relationship, are used to drive pairs of full-wave switches 164, 165 and 166, 167 respectively to enable alternate excitation of center-tapped windings 168, 169 of a two phase impeller by a D.C. source 170. This produces a quadrature phase shift in the impeller windings 168, 169 effecting a traveling magnetic field.

The D.C. resistance of the impeller windings changes with changing winding temperature which, therefore, effects the magnetic flux magnitude. Compensation for these changes can be made by regulating the impeller supply voltage. This is accomplished by placing temperature sensitive elements, such as nickel wire resistor 172, 173 in physical contact with the impeller windings 168, 169 respectively and wiring it into a conventional voltage divider 174. Temperature changes are experienced concurrently by the impeller windings and the temperature sensitive elements 172, 173. This circuit provides a sufficient voltage regulation to maintain an approximately constant impeller flux over the expected temperature range, the flux being sufficiently constant for the purposes for which it is used.

Figure 6:
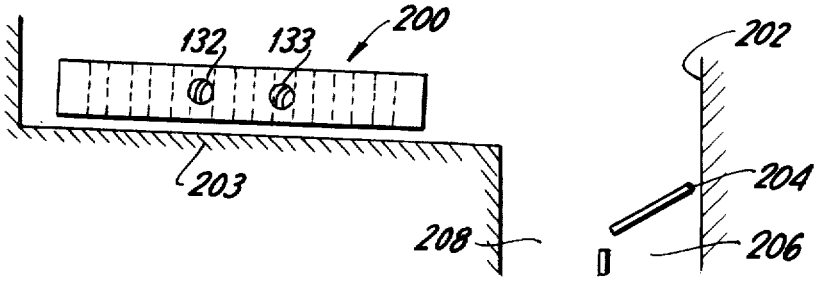
FIG. 6 is a schematic elevational diagram of a coin selector formed in accordance with a fourth embodiment of this invention.

Fourth Embodiment (FIG. 6)

The use of an electronic or photoelectric sensing system as described above for sensing the properties of a moving coin provides an immediate determination of the acceptability of a coin. Furthermore, also as described above, it is a simple matter to reverse the direction of magnetic field travel produced by the impeller. In this fourth embodiment, illustrated in FIG. 6, the sensors 132, 133 are located within the magnetic field region, for example, within the pole pieces or between adjacent coils intermediate the ends of an impeller 200. Several opportunities to utilize the impeller for additional functions are provided by the capability for reversing the direction of a coin drive at a suitable moment during the coin's travel past the impeller 200 and determining the acceptability as well as the denomination of acceptable coins at an instant when the coin remains under the influence of the impeller. For example, the length of coin travel can be reduced by decelerating the coin through reversal of magnetic field direction immediately after determination of the coin's authenticity and denomination. A substantial spacial separation of differing coins also can be achieved by selected use of coin deceleration or acceleration dependent upon the results of the determination of the coin's authenticity and denomination. In this manner, all rejected coins can be directed to a rejection chute while acceptable coins can be individually directed to an appropriate receptacle for the coin's particular denomination.

One construction for conserving space which can be utilized is schematically illustrated in FIG. 6 where a wall 202 is spaced downstream from an impeller 200 and coin support track 203 a distance slightly greater than the diameter of the largest coin which can be admitted to the coin selector. After the coin leaves the impeller 200, the coin abuts the wall 202 and tends to rebound toward the impeller 200; however, gravity prevents the coin from returning to the coin track. The coin therefore drops downwardly between the impeller 200 and the wall 202 toward a solenoid controlled inclined platform 204. If the coin is determined to be acceptable by logic circuitry of the type illustrated in FIG. 4, a control solenoid (not shown) is actuated to retract the platform 204 from the path of the coin allowing the coin to fall into an acceptance chute 206. If the coin is not acceptable, either because it is not authentic or because it is of an improper denomination, the control solenoid is not actuated and the coin strikes the platform 204 and bounces into a rejection chute 208. The amount of space required for this coin sensing device is minimized by elimination of the space normally alloted to accommodate the coin's trajectories.

Figure 7:
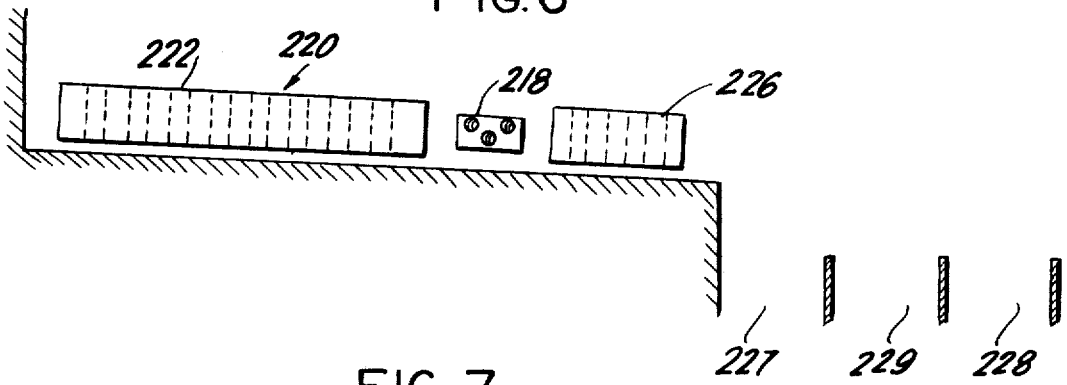
FIG. 7 is a schematic elevational diagram of a coin selector formed in accordance with a fifth embodiment of this invention utilizing a pair of linear motor impellers.
Figure 8:
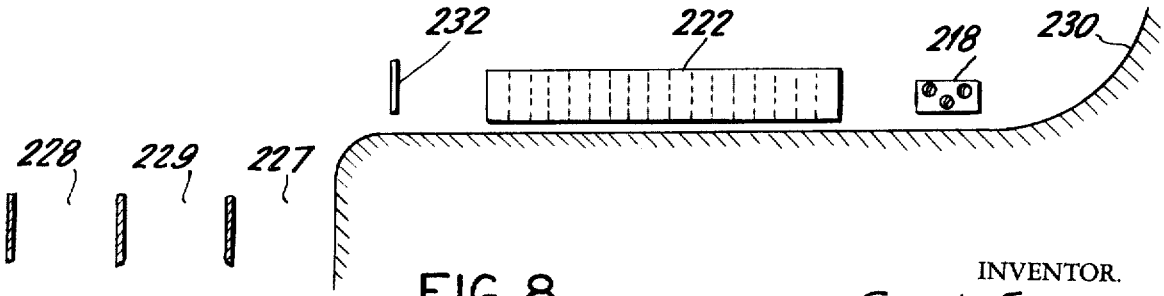
FIG. 8 is a schematic elevational diagram of a modification of the fifth embodiment of FIG. 7.
Figure 9:
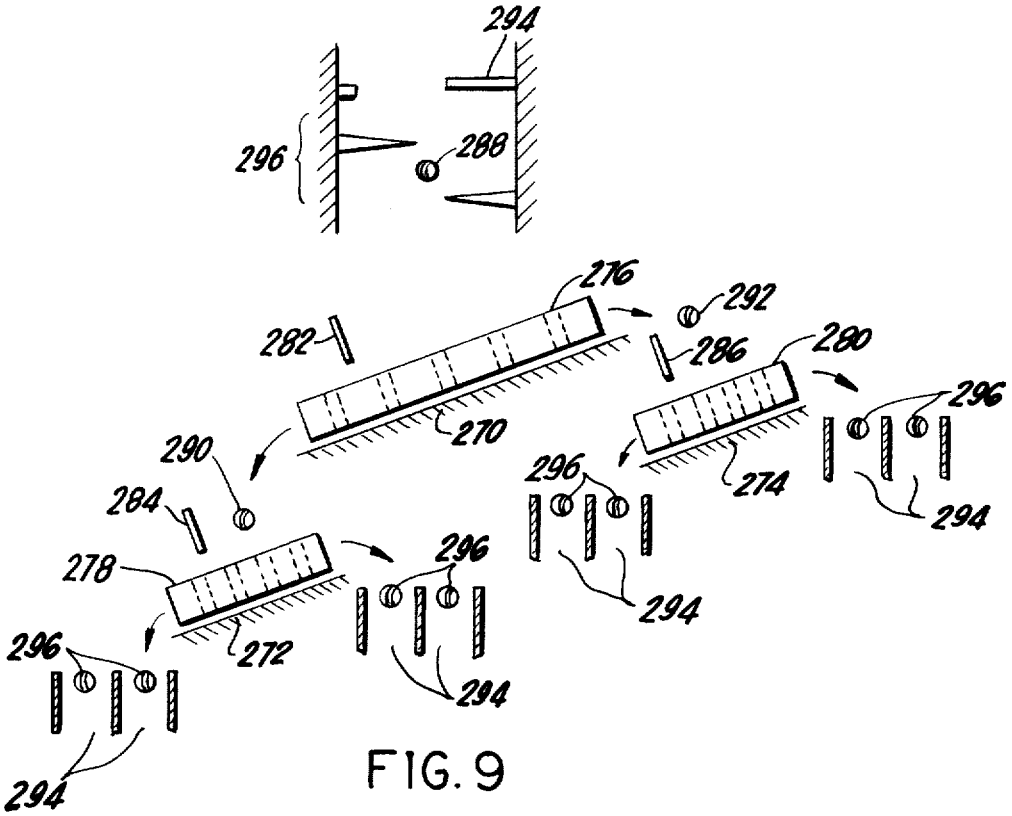
FIG. 9 is a schematic elevational diagram of a coin selector formed in accordance with a sixth embodiment of this invention utilizing a plurality of inclined impellers and coin support tracks.

Impeller Series (FIG. 7–9)

Some of the advantages of placing the sensors within the impeller region as described above can be achieved by using a second impeller located downstream from the sensors. Turning now to FIG. 7, there is schematically illustrated a coin selection system 220 having a primary impeller 222 which, as described earlier with reference to FIGS. 3 and 4, accelerates electrically conductive coins. The velocity and chordal dimension of the coin are examined by the sensors, shown as a unit 218, located immediately after the impeller 222 and the determination of coin acceptability and denomination is made by a combinatorial circuit as described earlier. A secondary impeller 226 is located immediately after the sensor unit 218 and, depending upon the determination already made of the coin's acceptability and denomination, the secondary impeller either decelerates or accelerates the coin at a predetermined magnitude so that the coin may be propelled into a proper chute such as chute 227 for rejected coins; chute 228 for nickels or chute 229 for dimes.

An alternative to this latest embodiment is illustrated in FIG. 8 wherein the primary impeller 222 additionally serves as a secondary impeller. After the coin is accelerated by the impeller 222 and passes the sensor unit 218, it rolls up a curved inclined portion of the coin support track 230 and eventually is returned by gravity toward the sensor unit 218 and the impeller 222. During the first pass of the coin by the sensor unit 218, the sensor unit, with associated logic circuitry such as shown in FIG. 4, compares the coin's velocity and chordal dimension with respective properties of acceptable coins so that by the time the coin returns, the coin analysis is complete. Depending upon the results of the examinations of the velocity and chordal dimension of the coin, during the return pass of the coin by the impeller 222, it accelerates the coin at different rates. This system sorts acceptable coins from the unacceptable coins and also separates the acceptable coins by denomination. Because the initial portion of the track 230 also serves as the exit a removable wall or stop 232 is provided. As a coin enters the system, it is forced to rest against the stop 232 by the impeller 222. The field direction of the impeller is then reversed and the coin is impelled toward the sensor unit 218. A solenoid (not shown) retracts the stop 232 out of the coin passageway to permit the coin to move off the track into the appropriate chute 227, 228 or 229. The stop 232 returns to its initial position after a predetermined time interval.

It is possible to reduce the number of sensors required and simplify the logic circuitry needed to perform coin discrimination by the use of a pluraity of small impellers and coin support tracks. Such a system is illustrated in FIG. 9 wherein three inclined coin tracks 270, 272, 274 and three corresponding impellers 276, 278, 280 are employed. The tracks and impellers are located such that a set of one track 272 and one impeller 278 is immediately below the lower end of the first impeller 276 and track 270 and the third impeller 280 and track 274 are located below the higher end of the first impeller 276 and track 270. The slope of each of the tracks depends upon the particular coin set with which the system is intended to be used. Three solenoid control stops 282, 284, 286 and three arrival sensors 288, 290, 292 are provided, one stop and one arrival sensor for each of the impellers 276, 278, 280.

A coin introduced to the system through an entrance slot 294 passes through a meander path 296 and by an arrival sensor 288 and eventually falls onto the first track 270 where it rests against a stop 282. Since the track 270 is inclined, the coin will roll toward the stop 282 and come to rest and there is no need for the impeller to move the coin toward the stop 282. After a predetermined period of time sufficient to allow all coins to come to rest the impeller 276 is energized as described above and, concurrently, the solenoid controlled stop 282 is removed from the path of the coin to prevent interference with the movement of the coin. The coin, depending upon its diameter, acceptance ratio and weight either will roll down the track 270 falling off the lower end thereof roll up the track 270 falling off the upper end thereof. In this manner, the first track 270 has performed an initial sorting function.

A coin which rolls off the lower end of the support track 270 passes the coin presence sensor 290 and falls onto the second coin track 272 where it comes to rest against the solenoid controlled stop 284. After sufficient time has elapsed the impeller 278 is energized and the stop 284 is removed by a solenoid (not shown) and a secondary discrimination is performed. Those coins which can be impelled up the track 272 by the impeller 278 roll off the upper end of the track in a spacial pattern dependent upon the coin's acceptance rato, weight and diameter and are collected in the chutes 294. Similarly, those coins which cannot be impelled up the track 272 will roll off the lower end of the track in a spacial pattern similarly representative of their acceptance ratio, weight and diameter and are collected in chute 295. A similar discrimination is performed by the third roll track 274 and impeller 280. In this fashion, at least four separations are available, namely, at the upper and lower ends of the tracks 272 and 274. Because of the spacial separation pattern which coins take due to the different velocities attained while on the tracks, a greater number of discriminations are available. FIG. 9 illustrates two chutes 294 at the upper end of each of the tracks 272, 274 and two chutes 295 at the lowere end of these tracks for receiving eight categories of coins.

A particularly appropriate application for a coin sensor utilizing this structure is as a denominational sorter of legitimate coins for use by coin collector entities such as vending companies, banks, supermarkets, etc., where the incidence of counterfeit and totally unacceptable coins is low because the coins are given an initial visual or coin sensor screening. A typical user would be the operator of some of the many vending machines which have a coin sensor which does not separate the acceptable coins by denomination, but merely places them in a common collection receptacle.

If desired, coin presence sensors such as photocells 296 may be located at the entrance to each of the coin chutes 294, 295 which receive the coins leaving the impellers with the output of the sensors being directed to a totalizer for calculating and recording the value of coins sorted.

Figure 10:
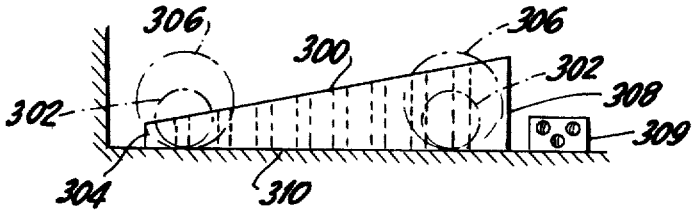
FIG. 10 is a schematic elevational diagram of a coin impeller formed in accordance with a seventh embodiment of this invention utilizing a tapered linear motor impeller.
Figure 11:
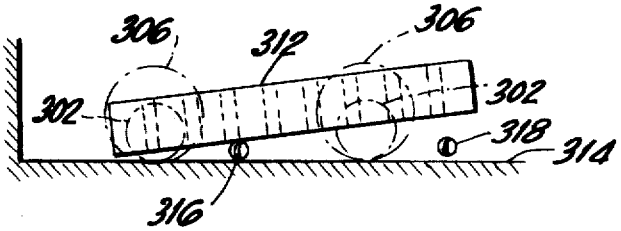
FIG. 11 is a schematic elevational diagram of a modification of the seventh embodiment of FIG. 10.

Inclined Impeller (FIGS. 10 and 11)

It has been found that often coins of two different denominations having the similar composition and only marginally differing diameters are accelerated to similar velocities by an impeller aligned parallel to the support track. In order to induce a greater velocity separation between such coins of different denominations, an impeller 300 having a tapered pole structure may be used. As can be seen in FIG. 10, the height of the impeller is varied from a dimension approximately equal to the diameter of the smallest acceptable coin 302 at one end 304 of the impeller to a dimension approximately equal to the diameter of the largest acceptable coin 306 at the other end 308 of the impeller. The smaller coin experiences an almost uniform flux throughout the length of the impeller 300 while the larger coin experiences a flux whose magnitude is a function of position along the impeller.

In addition to the variation in flux magnitude experienced by coins of different sizes, the location of the flux relative to the coin support track 310 also varies and plays an important part in the acceleration of the coins. The point about which the coins rotate as they roll down the track is the point of contact of the coin with the track. Given equal forces on the coin tending to make it rotate, the higher the force is located on the coin with respect to the track the more effective the force will be since the moment arm about the point of rotation will be greater. Looking at the coins at the beginning of the track 310 in FIG. 10, it can be seen that the forces on the small coin 302 are exerted over the entire height of the coin whereas the forces exerted on the larger coin 306 are exerted on the lower half of the coin. Because of the moment of inertia of a coin is a function of its diameter and because the coin acceleration is a function of the distance from the application of the moving force to the point of rotation of the coin, it can be seen that the acceleration of the coins will vary significantly depending upon the coin's diameter and the slope of the tapered impeller 300. As with the previous embodiments, after the coin leaves the impeller 300 its chordal dimension and velocity are examined by a sensor array 309 and associated combinatorial circuitry.

A similar result can be achieved by using a rectangular inclined impeller 312 as illustrated in FIG. 11. It can be seen that the smaller coins can be exposed completely to the magnetic field at the beginning of the coin support track 314 while only a small lower portion of the larger coin 306 is exposed to the magnetic field at the beginning of the coin track. As the coins progress down the track, a smaller percentage of the small coin 302 is exposed to the magnetic field while the point of application of the magnetic field on the larger coin 306 rises providing a larger torque and resulting in increased acceleration of the larger coin. Since the acceleration of coins of different sizes vary as the coin proceeds down the track 314 it is desirable to sense coin acceleration between two points along the path of coin travel. This is accomplished by locating two spaced apart photocells 316, 318 so that the coins pass the photocells while they are under the influence of the impeller 312. By using circuitry of the type described above with respect to FIG. 4, the time interval which the coin moves from the first photocell 316 to the second photocell 318 is recorded by a counter and, through the use of comparative circuitry, such as flip flops, a determination is made concerning the authenticity and denomination of the impelled coin.

I claim:

1. A device for determining the denomination of a coin comprising a coin passageway *including a track for supporting a coin on its edge,* means for admitting a coin to the passageway, an impeller of electrically conductive coins adjacent to the [passageway] *coin support track,* the impeller comprising means for generating a magnetic field traveling relative to a coin [in the passageway] *on the coin support track,* the generated magnetic field inducing eddy currents in the coin and interacting with the magnetic fields associated with the induced eddy currents to impel the coin *along the coin support track* in the direction of the traveling magnetic field, and means for examining a velocity related property of the coin *while the coin is still supported by the track and* after the coin has been exposed to at least a portion of the generated magnetic field.

2. A device for comparing characteristics of a coin with characteristics of a genuine coin of given denomination comprising a passageway for conducting the coin along a predetermined path, a magnetic field generator so positioned in proximity to the passageway that a coin in the passageway may be brought within its field, means associated with the generator to apply to a coin in the field a force having a component aligned with the path by moving the field relative to the passageway, and means for comparing [a characteristic representative of the velocity of] *the time for* the coin which has been acted upon by the field *to travel a known distance* with the corresponding [characteristic of] *time for* a genuine coin of the given denomination.

3. A method of determining the denomination of a *non-ferromagnetic electrically conductive* coin comprising the steps of generating a traveling magnetic field, directing a coin to *a coin support track in* the magnetic field so that the field impels the coin in a desired direction *along the coin support track*, and examining a velocity related characteristic of the coin when the coin has been impelled *along the coin support track and while it is still supported by the track.*

4. A method as defined in claim 3 wherein the traveling magnetic field is generated by moving a plurality of magnets relative to the coin in the direction in which it is desired to impel the coin.

5. A method as defined in claim 3 including the step of arresting the movement of the coin *along the coin support track immediately before* [as] the coin [approaches] *is subjected to* the traveling magnetic field.

6. A method as defined in claim 3 including the steps of arresting movement of a coin by impelling the coin in a first direction *along the coin support track* causing the coin to abut a stationary member and then impelling the coin in a second direction *along the coin support track* opposite to the first direction.

7. A method as defined in claim 3 wherein the *traveling magnetic field* [impeller] is *generated by an* electrically operated *impeller* and including the step of sensing the impeller coil temperature and regulating the impeller supply voltage as a function of the impeller coil temperature.

8. A method as defined in claim 3 wherein the velocity related property is examined while the coin is under the magnetic influence of the traveling magnetic field and including the step of varying the magnitude of the magnetic field by an amount based upon a predetermined [program] *function* related to the denomination of the coin.

9. A method as defined in claim 3 wherein *the coin support track along which* the coin is impelled [along] *is* an inclined track.

10. A method as defind in claim 3 including the steps of examining a chordal dimension of the coin, examining the velocity related characteristic while the coin is under the influence of the traveling magnetic field and comparing the coin's chordal dimension and velocity related characteristic with predetermined values to determine the denomination of the coin.

11. A method as defined in claim 10 including the step of varying the magnitude of the magnetic field by an amount based upon a predetermined [program] *function* related to the denomination of the coin.

12. A method as defined in claim 3 wherein the traveling magnetic field is generated by supplying a variable current to a plurality of longitudinally spaced coils such that the current through adjacent coils has a phase shift relationship.

13. A method as defined in claim 12 wherein the [impeller is] *coils comprise an* electrically operated and including the steps of *impeller* sensing the current supplied to the impeller, producing a signal dependent upon a velocity related characteristic of a coin, comparing that signal with predetermined signals characteristic of acceptable coins, and accounting for variations in the current from a predetermined standard during the comparison step.

14. A method as defined in claim 12 including the steps of arresting the movement of the coin in said direction *along the coin support track*, sensing the arrival of a coin *on the coin support track* and supplying the variable current to the coils in response to a signal from the coin sensor.

15. A method as defined in claim 14 including the steps of causing the coin to move in a first direction *along the coin support track* and abut against a stationary member and then impelling the coin in a second direction *along the coin support track* opposite to the first direction.

16. A device for determining the authenticity of a *non-ferromagnetic electrically conductive* coin comprising a coin passageway [having] *including* an entrance for the reception of a coin *and a coin support track for supporting a coin on its edge*, a coin accelerating impeller adjacent to the [passageway] *coin support track*, the impeller comprising means for generating a magnetic field having a component traveling along a region of the [passageway] *coin support track*, the magnetic field component being arranged to impel a coin along the [passageway] *coin support track*, and means for examining a function dependent upon the velocity of the coin *while it is still supported by the track and* after the coin has passed *along the coin support track* through at least a portion of the region.

17. The device of claim 16 wherein the [coin passageway includes a] a coin support track [having] has a slope greater than 0° and less than 5° to the horizontal.

18. The device of claim 16 including coin arrival sensing means for sensing the arrival of a coin in the device and means actuated by the arrival sensing means for actuating the impeller.

19. The device of claim 16 including means for reversing the direction in which the magnetic field travels.

20. The device of claim 16 including [a coin support across the passageway onto which a coin entering the device drops and] a coin stop adjacent to the coin support *track*, means for initially directing [the] *a coin* entering [coin] *the device* toward the coin stop *wherein the impeller impels* [and means to impel] the coin away from a position of rest against the coin stop toward the velocity dependent function examining means.

21. A device as defined in claim 16 wherein the impeller is electrically operated and including means for regulating the impeller supply voltage as a function of the impeller temperature so that the impeller provides a relatively constant magnetic flux as the impeller temperature varies.

22. The device of claim 16 wherein the velocity dependent function examining means provides an output signal related to the velocity of the coin while the coin is under the magnetic influence of the impeller, first circuit means for comparing the output signal with predetermined signals characteristic of acceptable coins and for providing a resultant signal indicative of the coin's denomination, means [sensitive] *responsive* to the resultant signal to modify the traveling magnetic field in order to spacially separate the coins in accordance with their velocity dependent function.

23. The device of claim 16 [wherein the coin passageway includes a coin support track adjacent to the impeller and] wherein the impeller provides a magnetic field region across the passageway which varies in location height above the coin support track along at least a portion of the length of the coin support track.

24. The device of claim 16 including means providing a first signal dependent upon the chordal dimension of the coin and wherein the velocity dependent function examining means provides a second signal related to the velocity of the coin as the coin passes said examining means and means for comparing the first and second signals with predetermined signals characteristic of acceptable coins.

25. The device of claim 16 wherein the impeller comprises at least one magnet having a component of motion in the direction in which it is desired to impel the coin.

26. The device of claim 25 [wherein the coin passageway includes a coin support track and] wherein the magnet is arranged for rotation about an axis positioned with relation to the passageway as to dispose in proximity to the support track a magnetic field having a major component in the desired direction of coin travel along the support track.

27. A device as defined in claim 16 wherein the impeller is electrically operated and wherein the velocity dependent function examining means provides an output signal dependent upon the velocity of the coin as the coin passes the examining means and including a first circuit means for comparing the output signal with predetermined signals characteristic of acceptable coins, means [sensitive] *responsive* to the impeller current and operatively connected to the first circuit means to modify the operation of the first circuit means to modify the operation of the first circuit means to compensate for variations in the impeller current.

28. A device as defined in claim 27 wherein the examining means includes a pair of coin presence sensors and wherein the first circuit means includes a pulsating signal source, a pulse counter, and gate means for gating the pulsating signal to the counter in response to *a* signal from the coin presence sensors, and wherein the pulsating signal source frequency is controlled by the impeller current sensitive means.

29. The device of claim 16 wherein [*the coin passageway includes a first coin support track adjacent to the coin accelerating impeller, said*] *the coin support track* track [sloping] *slopes* upwardly in the direction in which the magnetic field travels.

30. The device of claim 29 [including] *wherein the coin passageway includes* a second coin support track and a second impeller adjacent to the coin support track, the second coin support track and second impeller being located below one end of the [first] coin support track whereby coins leaving said one end of the [first] coin support track drop onto the second coin support track adjacent to the second impeller.

31. The device of claim 16 including means for arresting movement of the coin *along the coin support track immediately* before the impeller impels the coin toward the velocity dependent function examining means.

32. The device of claim 31 wherein the movement arresting means includes [a coin support across the passageway onto which the coin is directed, the coin support having] an initial section *of the coin support track* inclining from one end thereof and a second section declining from the other end of the first section, a coin stop adjacent to said one end and means for directing a coin entering the device toward the initial section whereby the coin rests against the coin support *track* and coin stop.

33. The device of claim 32 wherein the inclining and declining sections are each at an angle of between 0.5° and 5° from horizontal.

34. The device of claim 16 wherein the velocity dependent function examining means provides an output signal related to the velocity of the coin, first circuit means for comparing the output signal with predetermined signals characteristic of acceptable coins and for providing a resultant signal indicative of the coin's denominations, means [sensitive] *responsive to the resultant signal to modify the velocity of the coin in order to spacially separate the coin from other coins examined in accordance with the differences in their velocity dependent functions.*

35. The device of claim 34 wherein the means [sensitive] *responsive* to the resultant signal are arranged to further impel the coin an amount dependent upon the coin's denomination.

36. The device of claim 35 wherein the means [sensitive] *responsive to the resultant signal is arranged to impel the coin in a direction different from the coin's direction when the coin is exposed to the velocity dependent function examining means.*

37. The device of claim 16 wherein the impeller comprises a plurality of coils spaced in the desired direction of coin travel and an electrical power source for supplying a variable current to the coils in a manner such that a phase shift relationship exists between adjacent coils providing a magnetic field traveling in one direction.

38. The device of claim 37 including means for actuating the impeller at a predetermined point in the wave form of the variable current.

39. The device of claim 37 wherein each of the coils are wound around a pole piece and are located on one side of the coin passageway and including magnetic shunt means on the side of the passageway opposite the coils.

40. The device of claim 39 wherein the dimensions between two adjacent pole pieces is no greater than the diameter of the smallest coin which the device is designed to accept.

* * * * *

UNITED STATES PATENT AND TRADEMARK OFFICE

CERTIFICATE OF CORRECTION

PATENT NO. : Re. 29,090

DATED : December 28, 1976

INVENTOR(S) : Guy L. Fougere

It is certified that error appears in the above-identified patent and that said Letters Patent are hereby corrected as shown below:

Col. 13, line 19, "rato" should be --ratio--;

Col. 13, line 34, "lowere" should be --lower--.

Col. 17, (Claim 27) line 47, delete "to modify the operation of the first circuit means" (second occurrence);

Col. 17, (Claim 29) line 60, delete "track" (second occurrence).

Col. 18, (Claim 34), line 30 "denominations" should be --denomination--.

Signed and Sealed this

*twelfth* Day of *July 1977*

[SEAL]

*Attest:*

RUTH C. MASON
*Attesting Officer*

C. MARSHALL DANN
*Commissioner of Patents and Trademarks*